R. J. SCHNEIDER.
CHILD'S VEHICLE.
APPLICATION FILED JAN. 6, 1921.

1,392,973.

Patented Oct. 11, 1921.

Inventor
Richard J. Schneider,
By Samuel Herrick,
Attorney

UNITED STATES PATENT OFFICE.

RICHARD J. SCHNEIDER, OF OGALLALA, NEBRASKA.

CHILD'S VEHICLE.

1,392,973.  Specification of Letters Patent.  Patented Oct. 11, 1921.

Application filed January 6, 1921. Serial No. 435,389.

*To all whom it may concern:*

Be it known that I, RICHARD J. SCHNEIDER, a citizen of the United States of America, residing at Ogallala, in the county of Keith and State of Nebraska, have invented certain new and useful Improvements in Children's Vehicles, of which the following is a specification.

The object of the present invention is to provide a wheeled structure constituting a vehicle for the support, conveyance and entertainment of a small child and adapted to be propelled by such child.

It is an object of the invention to provide a structure of this nature constructed in such manner that it will be extremely strong and durable, will not be likely to get out of order, will be easy for the child to operate, may be steered by the feet and operated by the hands and will afford great pleasure and enjoyment to the user.

It is a further object of the invention to add to the attractiveness of the article by providing a horse's head at the front end thereof which is given a rocking motion during the operation of the vehicle.

Further objects and advantages of the invention will be set forth in the detailed description which follows.

In the accompanying drawing.

Like numerals designate corresponding parts in all the figures of the drawing.

Figure 1:
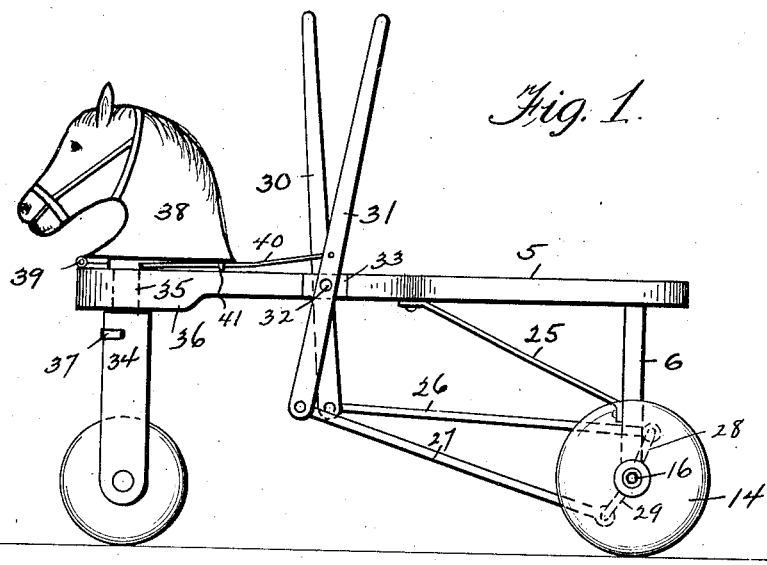
Figure 1 is a side elevation of a child's vehicle constructed in accordance with the invention.
Figure 2:
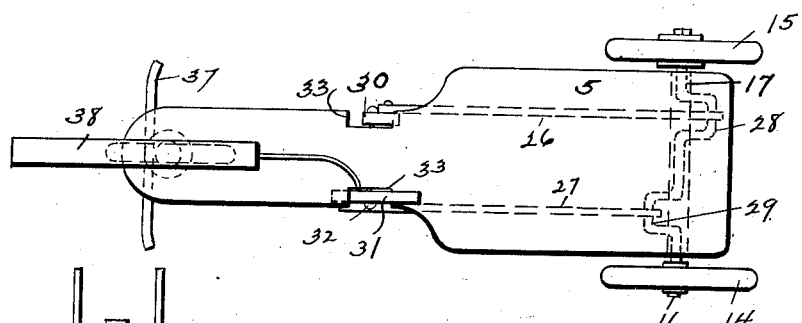
Fig. 2 is a plan view thereof.
Figure 3:
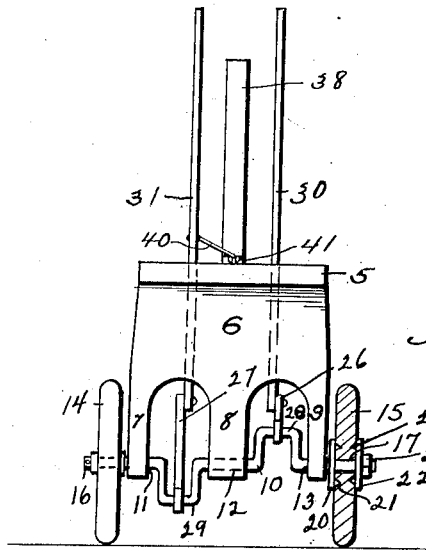
Fig. 3 is a rear elevation thereof.

Referring to the drawing 5 designates the body portion of the vehicle the rear end of which is supported upon a bolster 6. This bolster comprises three depending legs 7, 8 and 9 in which a crank 10 is journaled at 11, 12 and 13. This gives the crank a bearing not only adjacent its outer ends but at its central portions and this causes said crank to run true and acts to prevent binding of the same. The crank carries wheels 14, and 15, the wheel 14 being loose upon the shaft constituted by the outer end 16 of the crank and the wheel 15 being mounted to turn with the shaft 17 constituted by the other end of the crank. The mounting of the wheel 15 to turn with the shaft 17 may be effected in any one of a number of ways, but in order to render it possible to make the construction very economically and to employ solid wooden wheels, I provide upon the shaft 17 a flange 20 having prongs 21 and I provide a wing washer 22 having prongs 23, the prongs 21 and 23 being adapted to enter the body of the wheel and the wing washer 22 being forced toward the flange 20 when a nut 24 is screwed up.

A brace 25 extends between the body 5 and the bolster 6 and gives the necessary rigidity and strength to the bolster. Connecting rods 26 and 27 extend from the crank portions 28 and 29 to the lower ends of levers 30 and 31. These levers are pivoted at 32 in notched out portions 33 of the body portion 5. A head post 34 has its upper end reduced and is mounted to turn at 35 in an enlarged portion 36 of the body portion 5. A foot rest 37 carried by the post 34 enables the user to steer the vehicle by pressing with one foot or the other on the outwardly extending portion of the foot rest 37. A child seated upon the body portion 5 may by grasping the upper ends of the handles 30 and 31 impart rotation to the wheels 14 and 15 to propel the vehicle.

A horse's head 38 is pivoted at 39 to the body 5 and may be given a vertical, nodding or rocking action by a wire 40 the rear end of which is engaged with the handle 30 just above the pivot point 32 and the forward end of which projects beneath the head and slides in a staple 41. The angle of this rod with respect to the under face of the head 38 is changed as the lever 30 moves back and forth and thus the head is caused to rock upon its pivot 39.

It is to be understood that the invention is not limited to the precise construction set forth but that it includes within its purview whatever changes fairly come within either the terms or the spirit of the appended claims.

Having described my invention, what I claim is:

1. A device of the character described comprising a flat board like body, a bolster at the rear end thereof, a crank journaled in said bolster, wheels upon said crank, operating handles pivoted to the opposite sides of the body, connecting rods extending from the lower ends of said operating rods to said crank, a rotative head post, a front wheel carried thereby, a foot piece carried by said head post, a horse's head pivoted at its forward portion to the body, and a rod, one end of which is engaged with one of the operating handles and the other end of which engages said head to impart rocking motion thereto.

2. A device of the character described comprising a wheeled body portion, means for imparting motion to the wheels including a pivoted operating handle, a horse's head pivoted to the forward end of the body portion, a rod pivotally connected to operating handle and means upon the under side of the horse's head with which said rod engages and by which said rod is guided and whereby the shifting of the angle of the rod with respect to the upper surface of the body portion causes the horse's head to raise and lower.

3. In a child's vehicle the combination with a flat board like body, a horse's head pivoted to said body at the forward end thereof, an operating mechanism for the vehicle including a pivoted handle and a rod one end of which is pivotally connected to said handle and the other end of which slidably engages the under side of the horse's head to impart a rocking movement to the horse's head by the shifting of the angle of the rod with respect to the body.

In testimony whereof I affix my signature in the presence of two witnesses.

RICHARD J. SCHNEIDER.

Witnesses:
S. H. PENBECK,
EMMA M. LUTZ.